July 4, 1961 G. R. HOFFMAN ET AL 2,991,457

ELECTROMAGNETIC STORAGE AND SWITCHING ARRANGEMENTS

Filed April 5, 1957

4 Sheets-Sheet 1

July 4, 1961 G. R. HOFFMAN ET AL 2,991,457

ELECTROMAGNETIC STORAGE AND SWITCHING ARRANGEMENTS

Filed April 5, 1957

4 Sheets-Sheet 3

July 4, 1961 G. R. HOFFMAN ET AL 2,991,457

ELECTROMAGNETIC STORAGE AND SWITCHING ARRANGEMENTS

Filed April 5, 1957 4 Sheets-Sheet 4

United States Patent Office 2,991,457

Patented July 4, 1961

2,991,457

ELECTROMAGNETIC STORAGE AND SWITCHING ARRANGEMENTS

George Richard Hoffman, Sale, and Michael Anson Maclean, Manchester, England, assignors, by mesne assignments, to International Business Machines Corporation, New York, N.Y., a corporation of New York Filed Apr. 5, 1957, Ser. No. 651,049
Claims priority, application Great Britain Apr. 10, 1956
2 Claims. (Cl. 340—174)

This invention relates to electromagnetic storage and switching arrangements and particularly to such arrangements used as binary counters.

The arrangements described herein use one or more magnetic cores, having a so-called rectangular hysteresis-loop characteristic, together with one or more transistors.

These cores have two well-defined remanent magnetic states, to which it is convenient to refer as the "0" and the "1" states, distinguished by the direction of magnetic flux and established by a magnetising field in one direction, or the reverse direction. The magnetising fields are produced by a coil or coils wound on the core. Using a single coil, a core may be set to the "0" state by a current pulse in one sense and later reset to the "1" state by a current pulse in the opposite sense. However, it may be expedient to use alternative coils in which the direction of current flow is always the same, and wound to produce opposite magnetic fields. Such coils may be designated "0" and "1" coils according to the state in which they leave the core.

A further coil wound on the same core provides an output current pulse when the core changes from one state to the other and the direction of the current pulse indicates the state from which the core has changed.

The transistors are used as pulse shaping amplifiers to provide output signals and to switch the cores from one state to the other.

Cores of ferrite material made for matrix storage systems may be used. These cores have a switchover time of less than a microsecond. When used with junction type transistors as are at present available, the highest counting rate is limited to $2\times10^5$ pulses/sec.

The arrangements described herein are quiescent between input current pulses so that the mean power consumed is very small. Such arrangements are to be distinguished from known counters, having cross-coupling between a pair of valves or transistors, in which the state of the arrangement is determined by continuous flow of current in one part of the circuit or the other.

According to the present invention, an electromagnetic storage and switching arrangement comprises a magnetic core having first and second remanent states corresponding to opposite directions of magnetic flux in the core, the said core having wound thereon a first coil, a second coil connected in the base circuit of a transistor and a third coil connected in the collector circuit of the transistor, the said first coil being connected to means for producing therein current flow tending first to magnetise the core in the first state and later to magnetise the core in the second state, the second coil being connected in such sense that the transistor is rendered conductive when the core changes from the second state to the first state and the third coil being connected in such sense that collector current from the transistor flowing therein tends to magnetise the core in the first state.

The said first coil may be connected to a source of composite current pulses, each pulse comprising a positive-going part followed by a negative-going part.

However, it is preferred for the first coil to be connected in a network including a reactance, the said network being connected to a source of unidirectional current pulses and the said reactance serving to produce a reversal of current flow in the said first coil.

In order that the invention may be readily carried into effect, a number of embodiments will now be particularly described, by way of example, with reference to the accompanying drawings, of which:

FIGURES 7A to 7D are wave diagrams relating to the operation of the arrangement of FIGURE 6 and FIGURE 6A.

In these circuit arrangements, similar elements are indicated by the same references. Corresponding elements in different stages are indicated by the same references and a distinguishing suffix.

Figure 1:
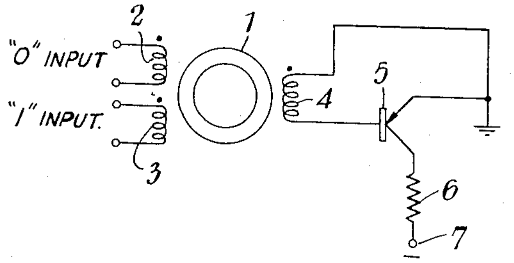
FIGURE 1 shows an electromagnetic storage and switching arrangement using one core and one transistor.

The coils are marked with a dot to indicate the end which becomes positive with respect to the other when the core is changed to the "0" state. In the practical form of these circuit arrangements, all the input windings have the same number of turns except in those cases where two such windings are connected in series as shown in the drawings.

FIGURE 1 shows the known basic circuit arrangement in which a core 1 having a rectangular hysteresis-loop characteristic has wound on it two similar input coils 2 and 3 connected respectively to "0" input and "1" input terminals. A coil 4 wound on the core 1 has one end connected to earth and the other end connected to the base electrode of a junction type transistor 5. The emitter of transistor 5 is connected to earth and the collector is connected through a load resistance 6 to a source of negative bias potential at terminal 7.

The "0" input consists of rectangular current pulses of sense to make the upper input terminal negative with respect to the lower. The passage of such a current pulse through the coil 2 causes the core 1 to change from the "1" state to the "0" state. If the core 1 is already in the "0" state, no change results from such "0" input pulse.

The "1" input consists of rectangular current pulses of sense to make the upper input terminal positive with respect to the lower. The passage of such a current pulse through the coil 3 changes the core 1 from the "0" state to the "1" state. If the core 1 is already in the "1" state, no change results.

An output voltage pulse is induced in the coil 4 with either change of state of the core 1, the upper end of the coil appearing positive upon change from the "1" state to the "0" state and the lower end upon change from "0" to "1."

Figure 2:
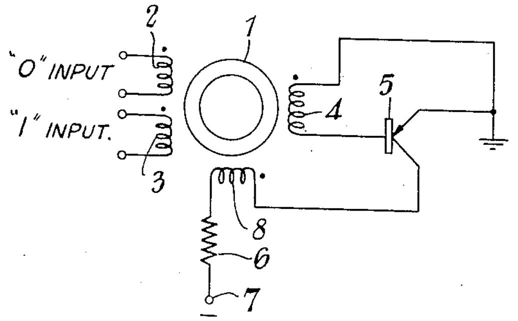
FIGURE 2 is a modified form of the arrangement of FIGURE 1 using a regenerative coil.
Figure 2A:
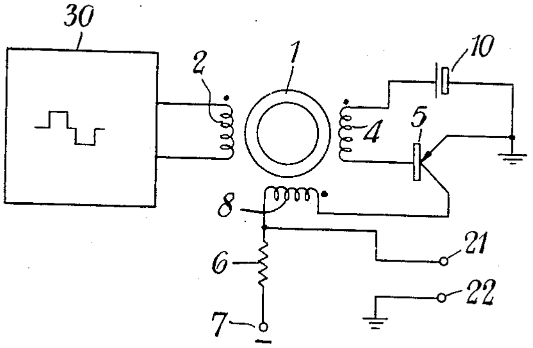
FIGURE 2A is a modified form of the arrangement of FIGURE 2, adapted for use as a binary counter of composite pulses.

When the circuit is quiescent, after it has been set into one state or the other, the emitter-base junction is either short-circuited, as shown in FIGURE 1, or biased in the reverse direction, by a source of potential as shown at 10 in FIGURE 2A, so that negligible collector current flows. If the core 1 is changed from the "0" state to the "1" state, the base is made more positive with respect to the emitter so that the transistor 5 is driven further into cut-off. If the core 1 is changed from the "1" state to the "0" state, the emitter is made positive with respect to the base so that collector current flows, developing a voltage across the load resistor 6.

The earthed emitter connection of the transistor 5 provides suitable loading with a practical number of turns of coil 4 and also provides current gain of the output pulses. The circuit is designed so that sufficient base current flows to saturate the transistor 5 so that the collector current is defined independently of the transistor characteristics. When the core has completely changed its state, the base current reverses and the collector current falls to the cut-off value after a short delay due to carrier storage. A reverse bias between emitter and base increases the rate of collector current decay.

Because the core 1 has a rectangular hysteresis loop, fields less than the coercive force have virtually no effect. When the circuit arrangement of FIGURE 1 forms one of a chain of similar stages, the collector current of the preceding stage under cut-off conditions can be permitted to reach a considerable value before the circuit becomes inoperative and spurious pulses of a large amplitude can be tolerated.

FIGURE 2 shows a known modification of the circuit arrangement shown in FIGURE 1, in which a further coil shown at 8, is wound on the core 1 and connected in the collector circuit of the transistor 5 in the sense to provide regeneration in the circuit.

Under quiescent conditions, in either remanent state of the core 1, the core has a low incremental permeability so that the regenerative gain round the circuit is small and the transistor 5 remains cut off. However, if the core 1 is in the "1" state and a field larger than the coercive force is set up by the coil 2, the incremental permeability is increased. Regeneration then starts and continues until the core is changed to the "0" state.

The advantage of the circuit of FIGURE 2 over that of FIGURE 1 is that the change of state can be initiated by a short pulse with the assurance that it will continue to completion.

A symmetrical binary counter is known comprising a combination of two core, coil and transistor arrangements, each of these arrangements being essentially as shown in FIGURE 2. In the two-core, combination, the two input coils 2 associated with the two cores are connected in series. The coil 8 in the collector circuit of the transistor driven by a coil 4 on one core is wound on the other core. A further coil is wound on each core and connected to a source of "set" current pulses so that one core may be set to the "0" state and the other to the "1" state before counting starts.

A "0" input pulse flows through both the series-connected input windings but causes only one of the transistors to become conductive. The collector current of this transistor flows through the coil 8 wound on the other core to produce a "1" pulse for that core which overrides the "0" input pulse. The initial state of the cores is therefore reversed. The next "0" input pulse changes the states back again. Each transistor thus gives an output pulse for alternate input pulses.

Figure 3:
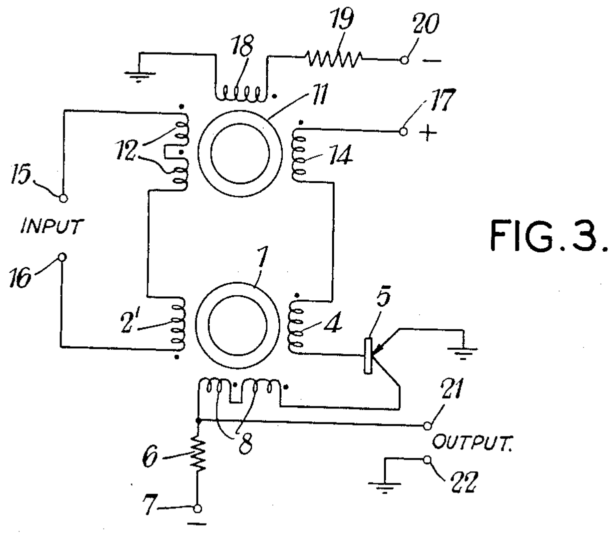
FIGURE 3 is an arrangement using two cores and one transistor.

In the arrangement shown in FIGURE 3, a core 1 has an input coil 2′ which, however, is reverse in winding sense from the coil 2 in the circuit of FIGURE 2, so that a "0" input current pulse produces a "1" magnetising field in the core. An output coil 4 and a regenerative coil 8 are connected respectively in the emitter-base and the collector circuits of a transistor 5 as in the arrangement shown in FIGURE 2.

A second core 11 has an input coil 12 connected in series with coil 2 between input terminals 15 and 16. The core 11 has a coil 14 connected in series with coil 4 between the base of transistor 5 and a source of positive bias at terminal 17. A further coil 18 is wound on the core 11 and is connected in series with a resistor 19 between earth and a negative D.C. source at terminal 20. Output terminals 21, 22 are connected between the junction of resistor 6 with coil 8 and earth.

In operation, the core 11 is set to the "1" state by a steady bias current flowing through the coil 18.

Assuming core 1 to be initially in the "1" state, a "0" input pulse changes the state of core 11 from "1" to "0" and leaves the state of core 1 unchanged at "1". The transistor 5 is thus triggered by the output pulse appearing across coil 14 of core 11. The resultant collector current of transistor 5 flowing through the regenerative coil 8 overrides the "1" magnetising field due to coil 2 and changes the "1" state of core 1 to "0".

After the operation of the circuit as described upon receipt of the first "0" input pulse, the core 11 is restored to the "1" state by the steady current flowing in coil 18.

Upon receipt of the next "0" input pulse, core 11 is again changed from the "1" state to the "0" state and an output pulse appears across coil 14. However, with core 1 in the "0" state, the "0" input pulse flowing through the reverse wound coil 2′ changes core 1 from the "0" state to the "1" state and an output pulse appears across coil 4. The output pulses appearing across coils 4 and 14 are in opposite sense so that transistor 5 is not triggered. Core 1 thus remains in the "1" state until the next input pulse when the cycle described is repeated.

An output pulse across resistor 6 appears between terminals 21, 22 for alternate input pulses.

In a practical form of this circuit arrangement, the output pulse from core 11 is made smaller in amplitude and duration than the pulse from core 1 by using one ferrite ring for core 11 and two such ferrite rings for core 1. This ensures that transistor 5 is not triggered when core 1 is initially in the "0" state. The reduced flux in the core 11 is no disadvantage since the output pulse across coil 14 has only to trigger the circuit of transistor 5 and core 1 into regenerative operation.

Figure 4:
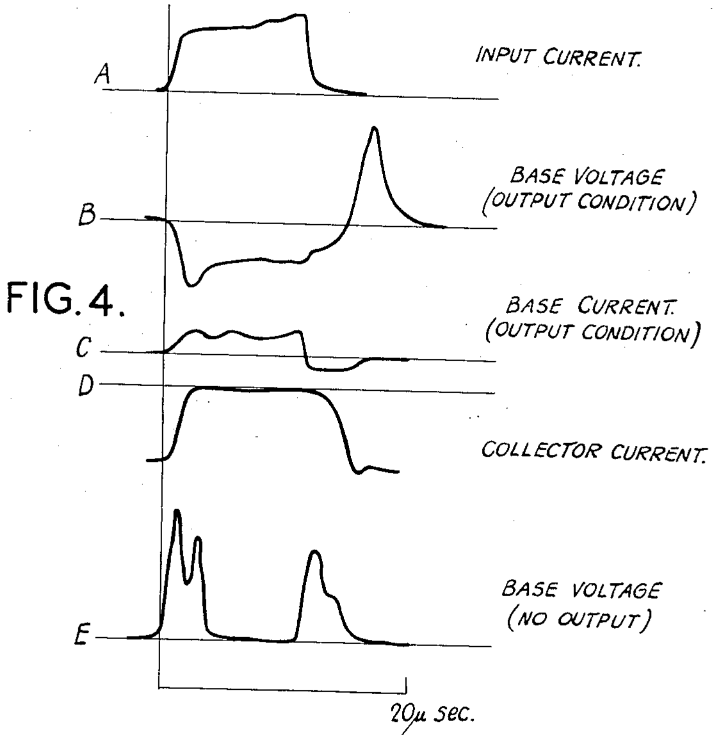
FIGURES 4A to 4E are current or voltage wave diagrams relating to the operation of the arrangement of FIGURE 3.

FIGURES 4A to 4E show the waveforms which appear in the circuit of FIGURE 3 when operated at an input pulse rate of $5\times10^4$ pulses/sec. FIGURE 4A shows the input current flowing through coils 12 and 2′, FIGURE 4B shows the base potential of transistor 5 during output and FIGURE 4C shows the base current; FIGURE 4D shows the collector current and FIGURE 4E shows the base voltage when no output occurs.

A chain of five counters of the type shown in FIGURE 3 has been operated satisfactorily at an input pulse rate of $2\times10^5$ pulses/sec.

In the counters described above with reference to FIGURES 2 and 3, it is essential that the input pulse should end before the counter output pulse. This condition is satisfied when the input is derived from a core and transistor circuit, as the delay at the start of the counter output pulse, see for example FIGURE 4D, results in a safe overlap at the end.

If a binary counter is to use only a single core, the arrangement must provide for an input pulse to change the state of the core in either direction from its initial state.

Figure 5:
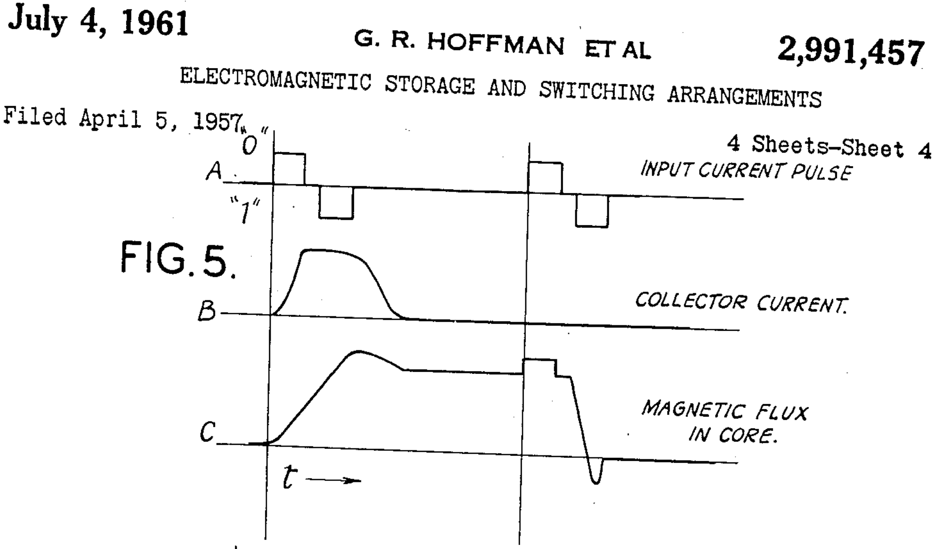
FIGURES 5A to 5C are simplified wave diagrams relating to the operation of the arrangement of FIGURE 2A.

A binary counter derived from the arrangement of FIGURE 2 is shown in FIGURE 2A, the coil 2 being connected to a source 30 of composite current pulses of the form shown in FIGURE 5A.

The coil 4 of the arrangement of FIGURE 2 is connected to a potential source 10 to provide a positive bias on the base of transistor 5 with respect to the emitter thereof. The coil 8 is connected through a resistor 6 to a negative potential source at terminal 7 as in FIGURE 2. Output terminals 21, 22 are connected between the end of resistor 6 remote from terminal 7 and earth. This arrangement of the output terminals provides a voltage output due to the flow of collector current in resistor 6. Alternatively, an output load may be connected in series with coil 8 and resistor 6 if an output current is required.

Assuming core 1 to be initially in the "1" state, the transistor 5 will be triggered by the positive-going or "0" part of the input pulse. The following negative-going or "1" part of the pulse is then masked by the collector current flowing in coil 8 so that core 1 is left in the "0" state after application of this composite input pulse.

Upon application of the next input pulse, the "0" part of the pulse leaves core 1 unchanged in the "0" state so that transistor 5 is not triggered. The following "1" part of the pulse changes core 1 from the "0" state to the "1" state and an output pulse appears across coil 4. The sense of this pulse is to bias transistor 5 further so that it is not triggered in this case for either part of the input pulse.

FIGURES 5B and 5C show respectively the collector current of transistor 5 and the magnetic flux in core 1 to the same time scale.

Figure 6:
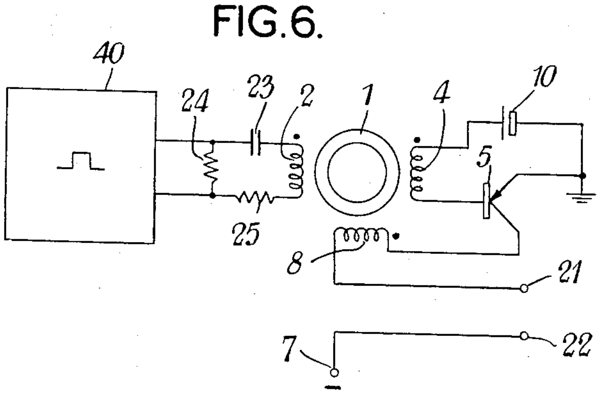
FIGURE 6 is a modified form of the arrangement shown in FIGURE 2A adapted for use as a binary counter of unidirectional pulses.

FIGURE 6 shows an arrangement generally similar to that shown in FIGURE 2A for use as a binary counter with unidirectional input pulses. The difference between the arrangement of FIGURE 6 and that of FIGURE 2A lies in the provision of a capacitor 23 and a resistor 25 forming a series combination with coil 2 and a resistor 24 in parallel with the series combination. The resistor 24 is connected between the output terminals of a source 40 of unidirectional pulses having the wave form shown inset. Output terminals 21, 22 are connected in series with coil 8 and terminal 7 to provide a current output.

Figures 6A, 7:
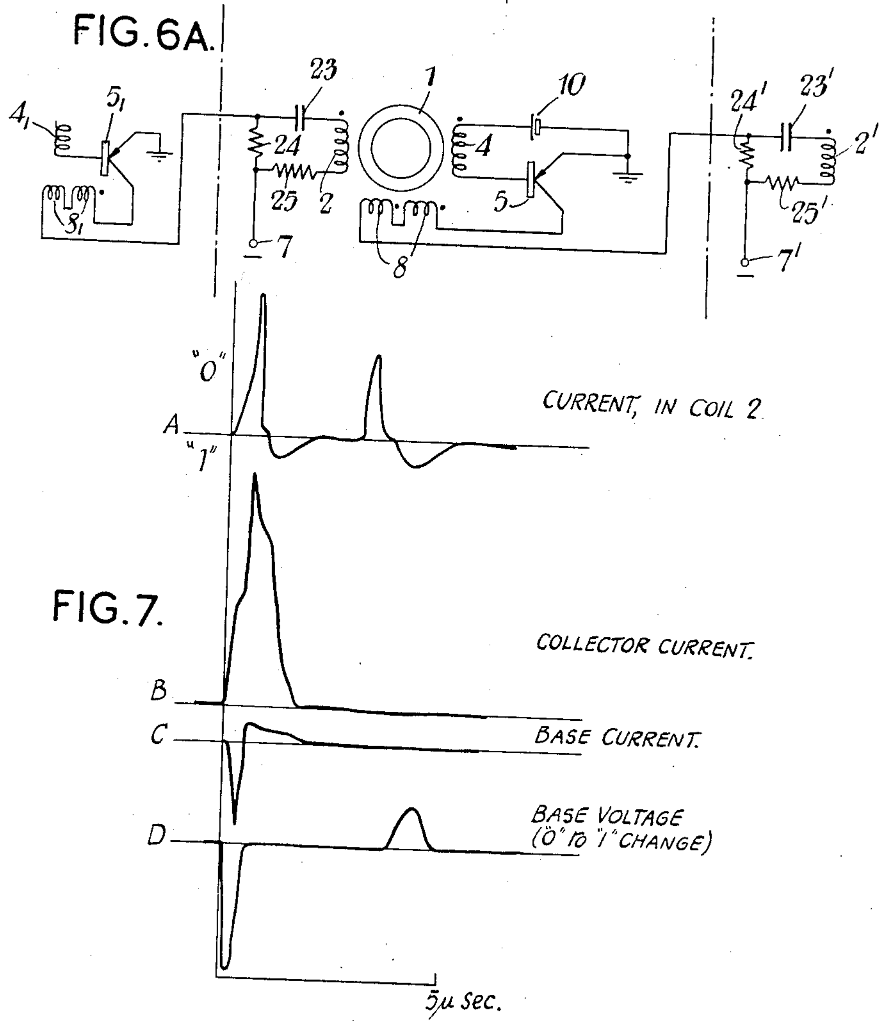
FIGURE 6A represents a series of arrangements as shown in FIGURE 6 forming a chain of binary counters.

FIGURE 6A shows the arrangement of FIGURE 6 used as one of a chain of binary counters.

The junction of resistor 24 and capacitor 23 is connected through coil $8_1$ to the collector of transistor $5_1$ of the preceding stage. The junction of resistors 24, 25 is connected to a negative supply at terminal 7.

Coil 8 is connected from the collector of transistor 5 through resistor 24′ of the network 24′, 23′, 2′, 25′ of the next stage to a negative supply at terminal 7′.

FIGURE 7 shows the waveforms appearing in the third counter of a chain such as shown in FIGURE 6A. Assuming the counter with which core 1 is associated to be the third counter, when transistor $5_1$ becomes conductive, collector current flows to terminal 7 and capacitor 23 charges to the supply voltage. The current through coil 2 is limited by resistor 25, the impedance of transistor $5_1$ and the impedance of coil 2, as shown in the rising portion of the curve 7A. As soon as transistor $5_1$ reaches maximum conductivity, the charging current of capacitor 23 quickly falls to zero. As shown in FIGURE 7A, a short pulse of current is produced in coil 2. This is arranged to be a "0" pulse, as shown in the figure, and of sufficient amplitude and duration, to initiate the regenerative operation of the circuit so that, with core 1 initially in the "1" state, a change to the "0" state results.

When transistor $5_1$ starts to cut off, capacitor 23 discharges through resistors 24 and 25 in series producing the negative-going or "1" part of the curve shown in FIGURE 7A. Thus an input current waveform is produced in coil 2 which is effectively that of the composite input pulse shown in FIGURE 5A.

The operation of the counter, for changes of state of core 1 in each direction will thus be understood from the explanation given with reference to FIGURE 2 and FIGURES 5A to 5C. The corresponding collector current and base current waveforms are shown respectively in FIGURES 7B and 7C. The base voltage waveform for a "0" to "1" change of state of core 1 is shown in FIGURE 7D.

Figure 8:
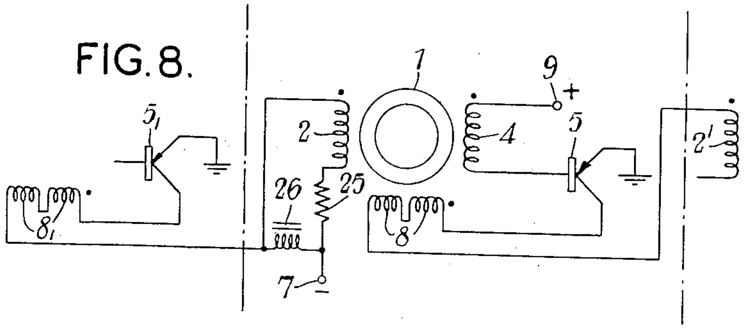
FIGURES 8 and 9 show modifications of the arrangement of FIGURE 6A.

In the arrangement shown in FIGURE 8, the coil 4 is connected to a positive bias potential source, such as the source 10 of FIGURE 2A, having its positive pole connected to terminal 9. The negative-going or "1" part of the input pulse is derived in an alternative manner. Coil $8_1$ is connected from the collector of transistor $5_1$ to terminal 7 through an inductor 26 and coil 2 in series with a resistor 25 is connected across inductor 26.

When transistor $5_1$ becomes conductive, current flows through coil 2 and resistor 25, because the impedance of inductor 26 is high, so driving core 1 in the "0" sense. During the pulse from transistor $5_1$, the current in inductor 26 increases and the energy so stored produces a reverse current to drive the core 1 to the "1" state when the collector current of transistor $5_1$ starts to fall.

Figure 9:
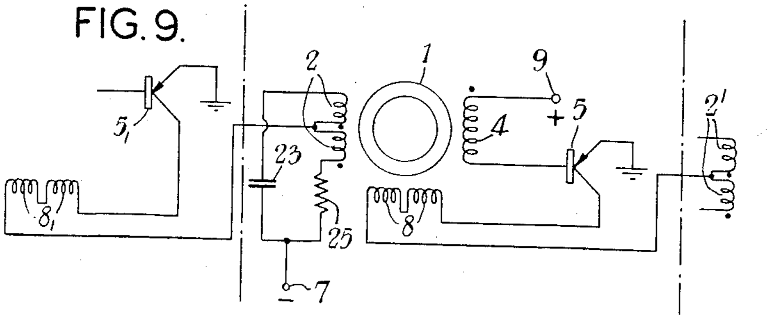

FIGURE 9 shows an arrangement in which the "1" part of the input pulse is derived in still another manner. The input coil 2 of core 1 is formed in two parts, the junction of which is connected to coil $8_1$. A capacitor 23 and a resistor 25 are connected in series across the ends of coil 2 and the junction of capacitor 23 and resistor 25 is connected to the negative supply at terminal 7.

At the commencement of a current pulse in the collector circuit of transistor $5_1$, the charging current flowing through the upper part of coil 2 and capacitor 23 is greater than the current flowing through the lower part of coil 2 and resistor 25, thus producing a resultant magnetising field in the "0" sense. When the capacitor 23 becomes fully charged, the current in the upper part of coil 2 is zero and the core is driven in the "1" sense by the current flowing in the lower part of the coil 2 and resistor 25. After transistor $5_1$ ceases to be conductive, capacitor 23 discharges through both parts of coil 2 in series, this drive also being in the "1" sense.

With the circuits shown in FIGURES 6, 8 and 9, the duration of the input pulse is more critical than with the counter shown in FIGURE 3, because the reactive circuit elements associated with the input coil do not discharge until the input current begins to fall. If the second part of the input pulse is to be masked in the manner shown in FIGURES 5A to 5C, it is desirable for the collector pulses to be increased slightly in duration from stage to stage. Provided that the collector pulses in every stage are sufficiently similar, however, the inherent delay is sufficient to ensure reliable operation.

In the practical design of the arrangements described with reference to FIGURES 2, 3, 6, 8 and 9, ferrite cores for matrix storage systems are used. With the exception mentioned with reference to FIGURE 3, the various coils are wound round two such cores used as a single core.

Suitable transistors for these arrangements must be able to supply high peak currents with some gain. Junction transistors designed for power amplification have been found satisfactory. Peak currents of up to 150 ma. have been found practicable without exceeding the rated 50 mw. dissipation. Fast "turn on" of the transistors results from using large base currents of up to 20 ma. The carrier storage time at the end of a pulse is then short as a large reverse current flows to turn the transistor off.

It is found that if the transistor bias voltage is increased, the base current is reduced slightly and the core changes state more quickly. Since the resultant magnetomotive force on the core is close to the coercive force, a small change of output current produces a large change of switching time and by this means the output pulse length can be varied from 2 to 12 microseconds by bias voltage adjustment.

We claim:

1. An electromagnetic storage and switching arrangement controlled by input signals comprising a magnetic core having first and second remanent states corresponding to opposite directions of magnetic flux in the core, the said core having wound thereon a first coil, a second coil connected in the base circuit of a transistor and a third coil connected in the collector circuit of the transistor, at least a portion of said first coil being connected in series with a capacitor and a first resistor, at least a portion of said first coil and said capacitor being connected in parallel with a second resistor connected to a source of unidirectional pulses, said capacitor serving to produce a reversal of current flow in the said first coil tending first to magnetize the core in the first state and later to magnetize the core in the second state, the second coil being connected in such sense that the transistor is rendered conductive when the core changes from the second state to the first state and the third coil being connected in such sense that the collector current from the transistor flowing therein tends to magnetize the core in the first state.

2. An arrangement comprising first and second electromagnetic storage and switching arrangements as claimed in claim 1, in which the transistor of the said first arrangement has its collector circuit connected to supply unidirectional current pulses to the first coil of the said second arrangement.

References Cited in the file of this patent

UNITED STATES PATENTS

| | | |
|---|---|---|
| 2,713,675 | Schmitt | July 19, 1955 |
| 2,747,110 | Jones | May 22, 1956 |
| 2,925,469 | Metzger | Feb. 16, 1960 |

OTHER REFERENCES

"A Transistor-Magnetic Core Circuit," by Guterman and Carey, published 1955, "IRE Convention Record—Part A," pp. 84–94.